United States Patent [19]

Boyesen

[11] 4,228,770
[45] Oct. 21, 1980

[54] INTERNAL COMBUSTION ENGINE FUEL SUPPLY SYSTEM

[75] Inventor: Eyvind Boyesen, Kempton, Pa.

[73] Assignee: Performance Industries, Inc., Kempton, Pa.

[21] Appl. No.: 42,803

[22] Filed: May 29, 1979

[51] Int. Cl.³ .................................................. F02B 33/04
[52] U.S. Cl. ................................ 123/73 V; 123/65 V; 123/73 R; 123/73 A; 123/433; 123/81 R; 123/188 R; 137/512.1; 137/855
[58] Field of Search ............ 123/73 V, 73 AA, 73 R, 123/73 A, 65 V, 75 B, 188 R, 81 R; 137/512.1, 512.15, 512.2, 525.3, 525.5

[56] References Cited

U.S. PATENT DOCUMENTS

| | | | |
|---|---|---|---|
| 2,332,916 | 10/1943 | Johnson | 123/73 V |
| 2,442,217 | 5/1948 | Smith | 123/73 V |
| 2,459,594 | 1/1949 | Smith | 123/73 V |
| 2,639,699 | 5/1953 | Kiekhaefer | 123/73 V |
| 3,008,459 | 11/1961 | Kaufmann | 123/73 V |
| 3,905,340 | 9/1975 | Boyesen | 123/73 V |

*Primary Examiner*—Wendell E. Burns
*Attorney, Agent, or Firm*—John T. Synnestvedt; Kenneth P. Synnestvedt

[57] ABSTRACT

A fuel supply system for an internal combustion engine having inlet porting and a fuel supply passage with valve means therein, the cross-sectional area lying within the outside passage walls being greater in the region of the valve means than in a region upstream of the valve means. Means are provided in the passage tending to equalize the velocity of the fuel flow through the supply passage in different regions thereof.

16 Claims, 4 Drawing Figures

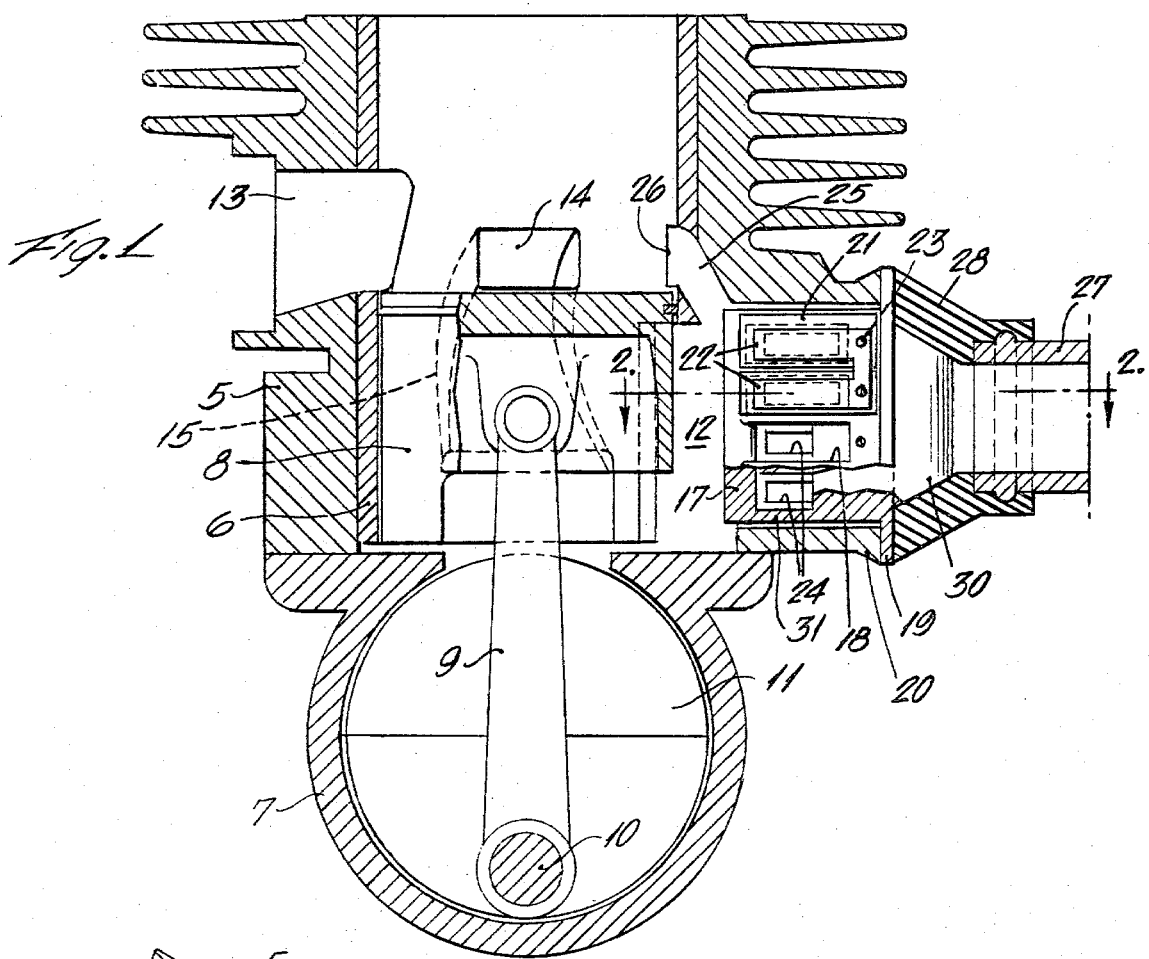
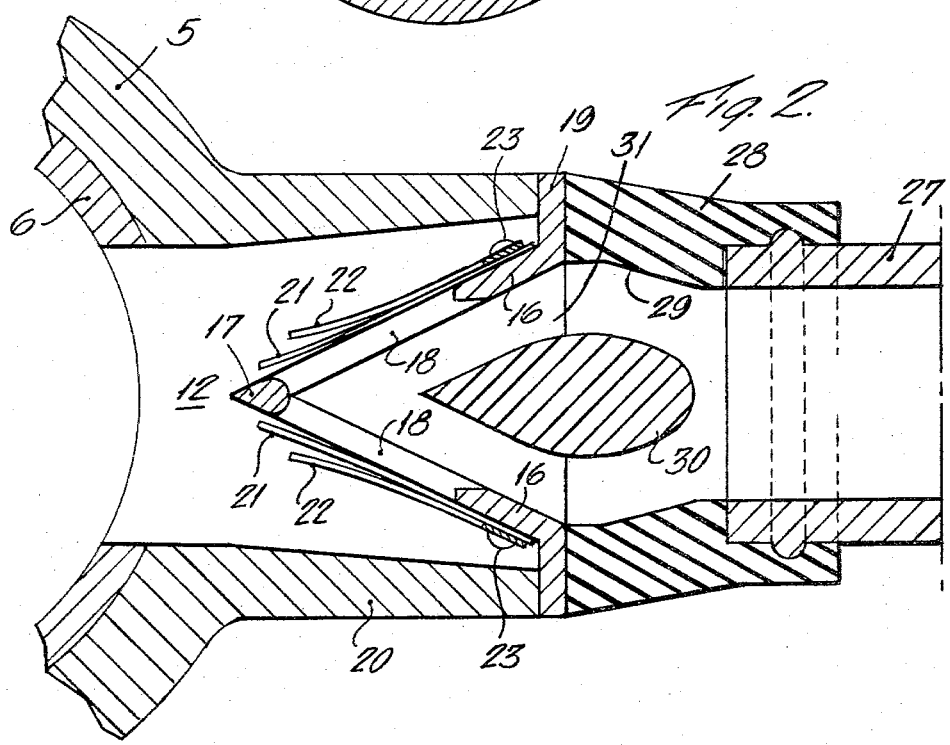

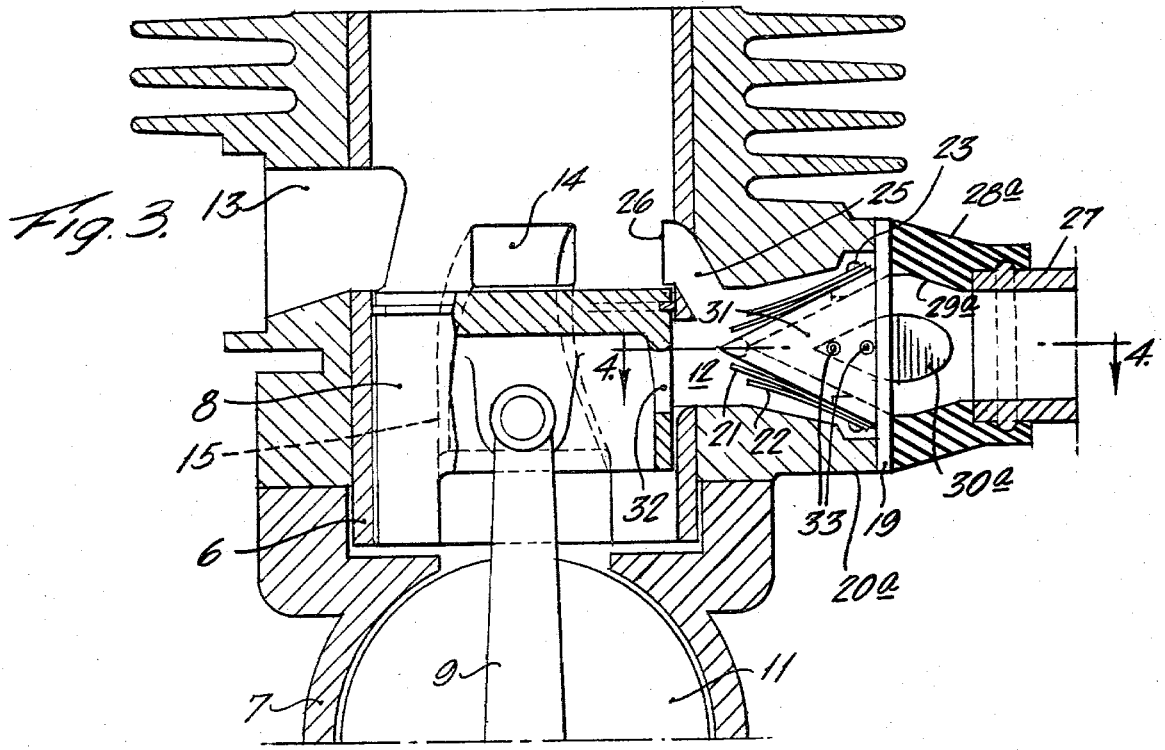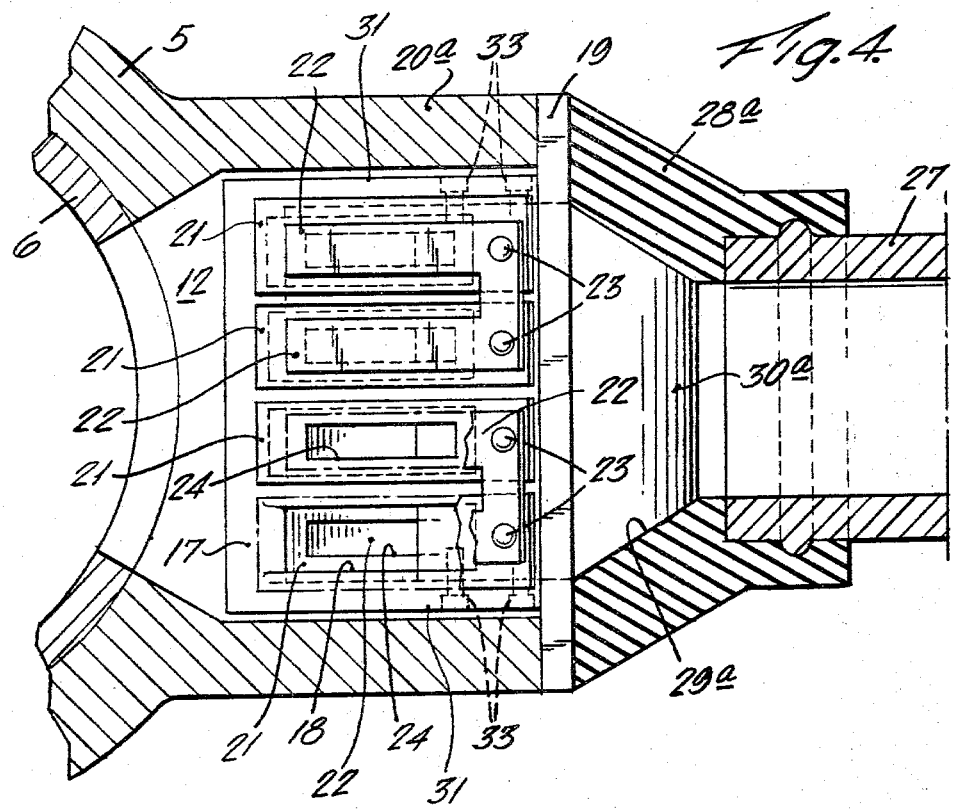

INTERNAL COMBUSTION ENGINE FUEL SUPPLY SYSTEM

INTRODUCTION AND BACKGROUND

This invention relates to internal combustion engines and is particularly concerned with a fuel supply system arranged to provide increased efficiency in the delivery of fuel to the engine.

The invention is applicable to engines of various kinds having a combustion chamber and having fuel inlet porting for delivering fuel either directly or indirectly to the combustion chamber, and certain aspects of the invention are applicable to engines of a variety of types, including engines with cylinders and reciprocating pistons therein, and engines in which the combustion chamber accommodates a rotary type of piston. Although the invention is applicable to a broad range of reciprocating piston and cylinder types of engines, the invention is herein illustrated and described as applied to a two-cycle internal combustion engine of the kind commonly employed in motorcycles, power saws, lawn mowers and other appliances and devices.

Still further, while the invention may be employed in association with fuel intake and valving systems of various kinds, the invention is particularly applicable in engines in which reed valves are employed in the fuel intake system, and the invention is, therefore, herein illustrated and described in connection with two-cycle engines employing reed valves.

In various types of engines above referred to, fuel intake porting is provided and the fuel supply means includes passage walls defining a fuel passage communicating with the inlet porting and having valve means in the passage to control the flow of fuel in the passage.

It is quite common, especially in two-cycle engines, to employ reed valves in the fuel supply passage in a region near the intake porting; and in order to accommodate the reed valve mechanism, the passage leading to the intake porting in the region of the reed valves must be of substantial cross-sectional area. This is particularly true where it is desired to employ a number of reed valves so as to maximize the fuel intake.

However, the portion of the fuel supply passage extending upstream to the carburetor or other means for introducing the fuel into the system, commonly has a cross-sectional area considerably smaller than the cross-sectional area in the region of the reed valves. It is of advantage in connection with the operation of the carburetor to avoid having a fuel delivery passage of excessive cross-sectional area, because for a given quantity of fuel and air, the rate of flow would be retarded; and in the operation of carburetors generally, the quantity of air and fuel intermixed in the carburetor is more accurately and reliably established where the velocity of delivery of the mixture is relatively high. It is, therefore, of significance in the operation of the carburetor to employ a delivery passage of relatively small cross-sectional area.

Since it is of importance to provide a space having a relatively large cross-sectional area in order to accommodate the desired reed valves and since it is desired to provide a carburetor delivery passage which is of relatively small cross-sectional area, the flow of the fuel from the passage of relatively small cross-sectional area into the space of relatively large cross-sectional area has heretofore resulted in substantial reduction in the velocity of fuel fed in the region of the reed valves. This is undesirable for several reasons, including the fact that a higher velocity in the region of the reed valves more effectively operates the reed valves; and in addition, the fluctuation in velocity of the incoming fuel mixture represents a waste of kinetic energy because of the deceleration of the fuel flowing to the cylinder.

STATEMENT OF OBJECTS AND ADVANTAGES

With all of the foregoing in mind, the present invention contemplates the provision of a means tending to equalize the fuel flow velocity in the supply passage, especially in the region of the valves where the passage walls ordinarily define a relatively large cross-sectional area.

In the preferred practice of the invention, the foregoing objective is achieved by the positioning of a bar-shaped element within the supply passage just upstream of the valves, the bar-shaped element preferably being of airfoil or aerodynamic shape having a rounded leading edge presented upstream in the flow passage and having an angular trailing edge portion presented downstream.

It is desirable that the cross-sectional area of said element in a plane transverse to the fuel supply passage be sufficient to substantially reduce the effective cross-sectional flow area in the region in which the passage walls would otherwise provide a relatively large cross-sectional flow area. In this way, the velocity of the fuel flow may be substantially maintained, with resultant improvement in efficiency and operating characteristics of the engine.

BRIEF DESCRIPTION OF DRAWINGS

How the foregoing objects and advantages are obtained will appear more fully from the following description referring to the accompanying drawings, in which—

FIG. 1 is a vertical sectional view through portions of a two-cycle internal combustion engine, in which the fuel supply system includes a plurality of reed valves arranged in association with a reed valve support or "cage" having its apex presented downstream of the fuel supply passage and in a position extended generally parallel to the axis of the cylinder;

FIG. 2 is a fragmentary horizontal sectional view taken as indicated by the section line 2—2 on FIG. 1, FIG. 2 being on an enlarged scale, as compared with FIG. 1;

FIG. 3 is a fragmentary view similar to FIG. 1 but illustrating another embodiment of the invention, in which the features of the invention are applied to a two-cycle internal combustion engine having a reed cage positioned with its axis extended generally transverse to the axis of the cylinder; and FIG. 4 is a horizontal sectional view taken as indicated by the section line 4—4 on FIG. 3, FIG. 4 being on an enlarged scale, as compared with FIG. 3.

DETAILED DESCRIPTION OF FIGS. 1 and 2

In FIGS. 1 and 2, a cylinder is indicated at 5, the cylinder having a liner 6 and being associated with a crankcase 7. The top closure of the cylinder is not illustrated. The piston 8 reciprocates in the cylinder and is associated with a connecting rod 9 associated with the crank 10 in the crankcase. The crank 10 rotates about the crankshaft (not shown), which may also carry the counterweight 11, all as is well-known in this art.

An intake port is indicated at 12, and the cylinder also has an exhaust port 13 and a transfer port 14 which communicates with the space below the piston by means of a transfer passage 15 formed in the wall of the cylinder. As is well-known in the operation of an engine of this type, the fuel and air mixture is admitted into the space below the piston when the piston is in its upper position, and as the piston moves downwardly toward bottom dead center position (the position shown in FIG. 1), the fuel is compressed in the space below the piston, so that at the bottom dead center position, when the transfer port 14 has been opened, the compressed fuel will flow upwardly through the transfer passage 15 and into the cylinder through the transfer port 14. When the piston rises from the bottom dead center position, the port 14 is closed (as is also the exhaust port 13), and the fuel is compressed in the upper portion of the cylinder, whereupon, usually by spark ignition, the fuel is burned and the piston driven downwardly again. The details of this well-known structure and operation need not be considered herein as they are well-known in this art.

In the engine shown in FIGS. 1 and 2, a reed valve cage of generally triangular cross section 16 is illustrated, this cage being formed of two valve seats positioned in planes which converge toward each other, i.e., toward the apex member 17, each of the valve seats 16 being provided with a series of valve ports 18 (four such ports being included in this embodiment) through which the fuel passes into the inlet port or porting 12, and thence either directly or indirectly into the combustion space in the cylinder for ultimate combustion to produce the downstroke of the piston. From FIGS. 1 and 2, it will be seen that at the base end of the reed valve cage, a flange 19 is provided which is adapted to be mounted against the extension 20 projecting from the cylinder in order to accommodate and mount the valve means in the fluid flow passage delivering fuel to the intake porting 12.

On each of the valve seats 16, reed valves are provided; and in the embodiment here illustrated, the reed valves associated with each port 18 include a primary reed 21 and a secondary reed 22. The reeds are secured in position by means of screws 23. As will be seen from comparison of FIGS. 1 and 2, each primary reed 21 is of sufficient size to overlie the entire area of the valve port 18 in the seat, and each such primary reed has a "vent" therein as indicated at 24, which vent is adapted to be covered by the secondary reed 22. Although the primary and secondary reeds 21 and 22 are illustrated as being slightly flexed away from the valve seats, it will be understood that when the valves are closed, the primary reed lies snugly against the valve seat and the secondary reed lies snugly against the primary reed. This multiple reed arrangement, which may for convenience be referred to as "vented" reeds, is fully disclosed in my prior U.S. Pat. No. 3,905,340, issued Sept. 16, 1975.

From FIG. 1, it will be seen that the inlet porting 12 is of substantial dimension axially of the cylinder and is open to the space below the piston even when the piston is in bottom dead center position. In addition, a passage 25 extends upwardly from the porting 12 and communicates with the space above the piston in bottom dead center position through a port indicated at 26, such passage and port providing for supplemental transfer and fuel intake when the piston is in the bottom dead center position.

The duct or connection 27, which is associated with the carburetor (not shown), is ordinarily of circular cross section; and as above indicated, is of substantially smaller internal cross-sectional area than the chamber within the extension 20 of the cylinder which accommodates the valve mechanism. Intervening between the duct 27 and the upstream edge of the reed valve cage, there is a connecting part 28 having diverging interior walls 29, this connecting part conveniently being formed of rubber or some composition material and adapted to be fastened at its downstream end to the cylinder through the reed cage flange 19 and adapted to be connected with the duct 27 in any suitable manner.

From the above, it will be seen that the passage walls leading from the carburetor to the intake porting have an internal cross-sectional area which is relatively large in a region at the upstream side of the valve means, as compared with the region in the duct 27 leading to the carburetor; and in the absence of provision to the contrary, this variation in the cross-sectional area of the flow passage would result in substantial decrease in velocity of the fuel mixture in a region just upstream of the valves.

As hereinabove pointed out, the present invention contemplates the provision of means tending to equalize the velocity of the fuel flow through the various regions of the intake passage. In the embodiment shown in FIGS. 1 and 2, the objective is achieved by the employment of an element 30 positioned within the region upstream of the valves where the cross-sectional area within the passage walls is relatively large, as compared with the upstream region extended to the carburetor. The element 30 preferably takes the form of a bar with its axis extended parallel to the planes of the valve seats 16 and parallel also to the apex member 17 of the reed cage. Actually, the bar may desirably be formed integrally with the end walls 31 of the reed cage itself although a portion of the bar projects upstream from the reed cage.

As clearly seen in FIG. 2, the element 30 has an aerodynamic or airfoil contour with a rounded leading edge presented upstream and with an angled training edge presented downstream. The cross-sectional area of the bar 30 is advantageously sufficient to approximately equalize the effective cross-sectional area of flow passage in the region of the bar as compared with the region upstream in the duct 27 extended to the carburetor. For efficient aerodynamic action, it is preferred that the trailing edge surfaces in the downstream portion of the bar 30 should substantially parallel the valve seat walls 16. This aerodynamic shape effectively serves to minimize fluctuation in the velocity of the fuel flow, without substantial impedence of the flow. As seen in FIG. 2, the apex member 17 of the reed cage also desirably has an aerodynamic cross-sectional shape, with the rounded leading edge presented upstream toward the trailing edge of the bar 30, and this further enhances the aerodynamic action in maximizing the flow of the fuel through the valve ports 18.

The maintenance of the relatively high velocity of flow in the region of the valves further enhances the action of the valve reeds, and the use of primary and secondary superimposed reed petals of the kind referred to above is also especially advantageous when used in combination with the aerodynamic bar 30. In explanation of this special advantage, it is first pointed out that with any reed valve, the opening commences at the extreme tip of the reed, the reeds being secured to the reed cage at the base end. With a valve employing single reeds, the tip of each reed is spaced farther downstream than the tip of the secondary reeds in an arrangement employing both primary and secondary reeds. In the absence of the aerodynamic bar, the secondary reed would be located in a region of lower fuel flow velocity; but with the presence of the aerodynamic bar, the opening of the secondary reeds is accelerated because of the increase in the fuel flow velocity in the region of the tip of each secondary reed.

In the embodiment of FIGS. 1 and 2, the intake porting 12 extends downwardly sufficiently to provide for communication with the space below the piston above the crankcase space, even when the piston is in bottom dead center position, and this provision, together with the supplemental port 25, is effective in maximizing fuel delivery into the combustion chamber above the piston. The space below the piston also communicates with the crankcase space.

DETAILED DESCRIPTION OF FIGS. 3 AND 4

In FIGS. 3 and 4, some of the parts are identified by the same reference characters as used in FIGS. 1 and 2, and the general arrangement of the cylinder, piston and crankcase will be apparent without repetitive description.

In the embodiment of FIGS. 3 and 4, a supplemental intake or transfer passage 25 is provided, but the intake porting 12 does not extend downwardly in the cylinder wall to a point below the piston. Instead of such opening, a port 32 is provided in the skirt of the piston, this port being positioned so that it will serve to extend the effective intake porting to provide for fuel intake throughout the entire stroke of the piston, as is the case in FIGS. 1 and 2, by virtue of the downward extension of the intake porting itself to the region below the piston skirt.

In the embodiment of FIGS. 3 and 4, the reed cage and reed valves comprise essentially the same components as described above with reference to FIGS. 1 and 2; but in FIGS. 3 and 4, the reed cage is positioned with its apex 17 extended transverse to the cylinder axis, instead of in a direction parallelling the cylinder axis, as in FIGS. 1 and 2. The reed cage is mounted by means of its base flange 19 on the outer edge of the extension 20a of the cylinder 5.

The duct 27, which is extended to the carburetor, also appears toward the right in FIGS. 3 and 4 and a rubber connecting part 28a intervenes between the duct 27 and the mounting flange 19 of the reed cage. The inside walls 29a of the connecting part 28a are, of course, extended in divergent planes which are somewhat differently arranged than in FIGS. 1 and 2, because of the different orientation of the parts.

The aerodynamic bar 30a employed in the embodiment of FIGS. 3 and 4 is also somewhat differently shaped as may readily be seen in order to span the space between the inclined walls 29a in the connecting part 28a. In this instance, the bar 30a is shown as being formed as a separate part from the reed cage, but is secured in the reed cage by means of screws 33, which are extended through the end walls 31 of the reed cage.

The aerodynamic shape, positioning and proportioning of the element 30a in the arrangement of FIGS. 3 and 4, may be as described above in connection with the element 30 of FIGS. 1 and 2.

CONCLUSION

It will thus be seen that the arrangement of the invention is readily adapted to employment in reed cages which are oriented either vertically or horizontally.

It will be understood that the proportioning and positioning of the aerodynamic bar employed to equalize the fuel velocity in different portions of the intake tract may be varied according to the shape of the passages involved. Moreover, somewhat different cross-sectional shapes may be employed for the element introduced in the fuel flow passage, but an aerodynamic cross-sectional shape is preferred because it is effective for the purpose of equalizing the velocity while at the same time, minimizing aerodynamic drag which would unnecessarily impede the flow of the fuel.

Dynamometer testing of an arrangement as herein disclosed established that the arrangement of the invention not only improved the fuel intake and carburetor function at the low and mid-range of engine speeds, but also effected increase in power and decrease in fuel consumption at the high end of the speed range.

I claim:

1. An internal combustion engine having a fuel inlet port and having fuel supply means, the fuel supply means including passage walls defining a fuel passage communicating with the inlet port and having reed valve means in the passage to control the flow of fuel through the passage, the valve means comprising a ported valve seat and a cooperating reed valve, the cross-sectional area within the passage walls being relatively large in a first region at the upstream side of the valve means as compared with a second region farther upstream, and an element positioned in said relatively large region, said element having a cross-sectional area in a plane transverse to the fuel passage sufficient to substantially reduce the effective cross-sectional flow area in said region of relatively large cross-sectional area.

2. An internal combustion engine as defined in claim 1 in which said element is of aerodynamic shape having a rounded surface presented in the upstream direction and having angularly converging surfaces presented in the downstream direction.

3. An internal combustion engine as defined in claim 1 in which said element is bar-shaped with its axis extended in a direction parallelling the plane of the reed valve, the bar-shaped element being extended from one side of the fuel passage to the other side thereof in said relatively large first region, and in which said bar-shaped element is of aerodynamic cross-sectional shape with a rounded leading edge presented in the upstream direction and with an angular trailing edge presented in the downstream direction.

4. An internal combustion engine having a fuel inlet port and having fuel supply means, the fuel supply means including passage walls defining a fuel passage communicating with the inlet port and having reed valve means in the passage to control the flow of fuel through the passage, a reed valve cage having ported valve seats positioned in planes angularly converging at an apex presented downstream of the fuel flow in the passage and reed valves overlying the downstream side of each valve seat, the cross-sectional area within the passage walls being relatively large in a first region at the upstream side of the valve means as compared with a second region farther upstream, and an element positioned in said relatively large region, said element having a cross-sectional area in a plane transverse to the fuel passage sufficient to substantially reduce the effective cross-sectional flow area in said region of relatively large cross-sectional area.

5. An internal combustion engine as defined in claim 4 in which said element has angularly converging surfaces presented downstream of the flow through the fuel passage, with said surfaces presented in spaced relation toward and generally parallelling the planes of the angularly converging valve seats.

6. An internal combustion engine as defined in claim 4 in which said element is bar-shaped with its axis extended in a direction parallelling the apex of the planes of the valve seats, the bar-shaped element being extended from one side of the passage to the other side thereof in said relatively large first region, and in which said bar-shaped element is of aerodynamic cross-sectional shape with a rounded leading edge presented in the upstream direction and with a trailing edge presented in the downstream direction and parallelling the apex of the converging planes of the valve seats.

7. An internal combustion engine as defined in claim 6 in which the trailing edge portion of the aerodynamic bar-shaped element is formed between angularly positioned surfaces on the trailing edge portion of the element, which surfaces generally parallel the planes of the angularly converging valve seats and are presented toward but in spaced relation to the valve seats.

8. An internal combustion engine as defined in claim 7 in which the trailing edge portion of the bar-shaped element is nested within the reed cage and in which the leading edge portion of said element projects into the fuel passage upstream of the reed cage.

9. An internal combustion engine having a cylinder with a fuel inlet port and having fuel supply means, the fuel supply means including passage walls defining a fuel passage communicating with the inlet port and having reed valve means in the passage to control the flow of fuel through the passage, a reed valve cage having ported valve seats positioned in planes angularly converging at an apex extended transverse to the cylinder axis in a direction downstream of the fuel flow in the passage and multiple reed valves overlying the downstream side of each valve seat, the cross-sectional area within the passage walls being relatively large in a first region at the upstream side of the valve means as compared with a second region farther upstream, and an element positioned in said relatively large region, said element being bar-shaped and having surfaces converging in the downstream direction to an apex parallelling the apex of the valve seats and presented downstream of the flow through the fuel passage, with said surfaces presented in spaced relation toward and generally parallelling the planes of the angularly converging valve seats, and said element having a cross-sectional area in a plane transverse to the fuel passage sufficient to substantially reduce the effective cross-sectional flow area in said region of relatively larger cross-sectional area.

10. An internal combustion engine as defined in claim 9 in which the bar-shaped element is of aerodynamic cross section having a rounded leading edge presented upstream of the flow in the fuel passage.

11. An internal combustion engine as defined in claim 10 in which the trailing edge portion of the bar-shaped element is nested within the valve cage.

12. An internal combustion engine having a fuel inlet port and having fuel supply means, the fuel supply means including passage walls defining a fuel passage communicating with the inlet port and having reed valve means in the passage to control the flow of fuel through the passage, a reed valve cage having ported valve seats positioned in planes angularly converging at an apex presented downstream of the fuel flow in the passage and reed valves overlying the downstream side of each valve seat, the cross-sectional area within the passage walls being relatively large in a first region at the upstream side of the valve means as compared with a second region farther upstream, and an element positioned in said relatively large region, means mounting said element in said reed cage with a portion thereof projecting upstream from the reed cage, and said element having a cross-sectional area in a plane transverse to the fuel passage sufficient to substantially reduce the effective cross-sectional flow area in the region of relatively large cross-sectional area.

13. An internal combustion engine having a cylinder with a fuel inlet port and having fuel supply means, the fuel supply means including passage walls defining a fuel passage communicating with the inlet port and having reed valve means in the passage to control the flow of fuel through the passage, a reed cage having ported valve seats positioned in planes angularly converging at an apex extended parallel to the cylinder axis in a direction downstream of the fuel flow in the passage and multiple reed valves overlying the downstream side of each valve seat, the cross-sectional area within the passage walls being relatively large in a first region at the upstream side of the valve means as compared with a second region farther upstream, and an element positioned in said relatively large region, said element being bar-shaped and having surfaces converging in the downstream direction to an apex parallelling the apex of the valve seats and presented downstream of the flow through the fuel passage, with said surfaces presented in spaced relation toward and generally parallelling the planes of the angularly converging valve seats, and said element having a cross-sectional area in a plane transverse to the fuel passage sufficient to substantially reduce the effective cross-sectional flow area in said region of relatively larger cross-sectional area.

14. An internal combustion engine having a piston and cylinder with fuel inlet port means providing for fuel inlet substantially throughout the stroke of the engine and having fuel supply means, the fuel supply means including passage walls defining a fuel passage communicating with the inlet port means and having reed valve means in the passage to control the flow of fuel through the passage, the valve means comprising a ported valve seat and a cooperating reed valve, the cross-sectional area within the passage walls being relatively large in a first region at the upstream side of the valve means as compared with a second region farther upstream, and an element positioned in said relatively large region, said element having a cross-sectional area in a plane transverse to the fuel passage sufficient to substantially reduce the effective cross-sectional flow area in the region of relatively large cross-sectional area.

15. An internal combustion engine having a fuel inlet port and having fuel supply means, the fuel supply means including passage walls defining a fuel passage communicating with the inlet port and having reed valve means in the passage to control the flow of fuel through the passage, a reed valve cage having ported valve seats positioned in planes angularly converging toward an apex member presented downstream of the fuel flow in the passage and reed valves overlying the downstream side of each valve seat, said apex member being of aerodynamic shape with a rounded leading edge portion presented upstream and with an angular trailing edge presented downwardly of the fuel flow, the cross-sectional area within the passage walls being relatively large in a first region at the upstream side of the valve means as compared with a second region farther upstream, and an element positioned in said relatively large region, said element having a cross-sectional area in a plane transverse to the fuel passage sufficient to substantially reduce the effective cross-sectional flow area in said region of relatively large cross-sectional area, and in which said element is bar-shaped with its axis extended in a direction parallelling the apex of the planes of the valve seats, the bar-shaped element being extended from one side of the passage to the other side thereof in said relatively large first region, and in which said bar-shaped element is of aerodynamic cross-sectional shape with a rounded leading edge presented in the upstream direction and with a trailing edge presented in the downstream direction toward the leading edge of said apex member.

16. An internal combustion engine having a fuel inlet port and having fuel supply means, the fuel supply means including passage walls defining a fuel passage communicating with the inlet port and having reed valve means in the passage to control the flow of fuel through the passage, the valve means comprising a ported valve seat and a cooperating reed valve, the passage walls being differently spaced in different regions and providing a cross-sectional area within the passage walls which is relatively large in a first region at the upstream side of the valve means as compared with a second region farther upstream, and means tending to equalize the velocity of the fuel flow through regions of different cross-sectional area within the passage walls, said last means being located in the passage upstream of the valve means.

* * * * *